United States Patent [19]

Soto et al.

[11] Patent Number: 5,008,325

[45] Date of Patent: Apr. 16, 1991

[54] POLYURETHANE-UREA RESINS WITH INCORPORATED HYDROPHOBIC MICROPARTICLE FILLERS

[75] Inventors: Jorge Soto, Concord; Joginder N. Anand, Clayton, both of Calif.; Richard D. Peffley, Lake Jackson, Tex.

[73] Assignee: The Dow Chemical Company, Midland, Mich.

[21] Appl. No.: 498,079

[22] Filed: Mar. 23, 1990

[51] Int. Cl.$^5$ .................... C08G 18/00; C08L 51/00; C08K 9/00; C08J 3/20
[52] U.S. Cl. .................................. 524/504; 528/44; 523/205; 523/351
[58] Field of Search .......................... 524/504; 528/44; 523/322, 205

[56] References Cited

U.S. PATENT DOCUMENTS 4,742,095  5/1988  Markusch et al. .................. 523/322

FOREIGN PATENT DOCUMENTS 189945  8/1986  European Pat. Off. .

Primary Examiner—Joseph L. Schofer
Assistant Examiner—Wu C. Cheng

[57] ABSTRACT

Disclosed are novel, stable aqueous dispersions of ionic polyurethane-urea prepared by reacting an aliphatic or cycloaliphatic diisocyanate, an organic polyol, a large particle size hydrophobic copolymer polyol, a difunctional isocyanate reactive component, and a water dispersible amine chain extender. Also disclosed are the films and coated substrates obtained through the use of said dispersions as coatings.

7 Claims, No Drawings

POLYURETHANE-UREA RESINS WITH INCORPORATED HYDROPHOBIC MICROPARTICLE FILLERS

SUMMARY OF THE INVENTION

This invention relates to stable aqueous dispersions of polyurethane-urea particles in a continuous aqueous phase.

Stable aqueous dispersions of polyurethane-polyureas containing chemically incorporated anionic or cationic groups have long been known to be useful in various coating applications. The coatings and sizings prepared from the dispersions have excellent chemical resistance, abrasion resistance, toughness, and the like.

D. Dieterich et al. as early as 1970 published one of the first technical reviews on ionic polyurethane-urea aqueous dispersions: see Angewante Chemie Intn'l. Ed 9, pp. 40–50 (1970). This was followed by a comprehensive review by the same author in Progress In Organic Coatings 9 (1981), pp. 218–340. For the most part, the polymers are prepared from components which are essentially difunctional in both isocyanate and isocyanate-reactive ingredients.

U.S. Pat. No. 3,870,684 discloses aqueous dispersions of polyurethane-polyureas wherein the cross-linking is effected by mixing as a solution in an organic solvent an isocyanate terminated prepolymer having ionic groups with an aqueous solution of an aliphatic polyamine containing a total of at least three primary and/or secondary amine groups of which at least two are primary. These compositions, also known as latexes, have the advantage of being able to form cross-linked polymers as aqueous dispersions while avoiding the prior art problems of the formation of lumps and curds. However, the method of preparation requires organic solvents and the need for highly functional polyamines.

U.S. Pat. No. 4,203,883 discloses cross-linked polyurethane-polyureas closely related to those set forth in U.S. Pat. No. 3,870,684 cited supra. The cross-linking is effected by reacting an isocyanate terminated polyurethane prepolymer containing tertiary amine neutralized carboxylic acid groups with a triamine or mixture of triamine with diamine. Again, the employment of organic solvent is favored at least in the preparation of the prepolymer component.

U.S. Pat. No. 4,408,008 also discloses stable aqueous dispersions of cross-linked urea-urethane polymers wherein the cross-linking is achieved through the use of polyfunctional amine chain extenders with average functionalities of 2.2–6. The polymers achieve their aqueous dispersibility primarily by having monomer ingredients carrying non-ionic hydrophilic oxyethylene chains in pendant or lateral configuration.

U.S. Pat. No. 4,501,852 discloses stable aqueous dispersions which can be either linear or cross-linked depending on the functionality of the polyamine extender reacted with the prepolymer. The novelty in this disclosure stems from the fact that a combination of anionic groups and a small proportion of lateral or terminal hydrophilic oxyethylene chains are present in the prepolymer with the neutralizing counterions of the anionic groups being a mixture of volatile and non-volatile cations. The latter, in the form of low boiling tertiary amines, are easily evolved from the final aqueous polymer dispersion when films are being formed.

There are two problems inherent in films or coatings prepared from dispersions of polyurethane-urea resins. One is that these resins tend to absorb water into the coatings prepared from such resins and this causes degradation of the resin because of hydrolysis. Thus the product life of the film or coating is diminished.

Another problem which occurs because of the absorption of water into the film, is that the dimensional stability of the film is changed, i.e., it will swell. This may cause the film or coating to separate from the substrate to which it is applied.

U.S. Pat. No. 4,306,998 discloses a process for providing a storage stable, aqueous dispersion of oligourethanes or polyurethanes in a mixture with auxiliary agents and additives which are neither soluble or dispersible in water.

U.S. Pat. No. 4,688,060 discloses a pressure sensitive manifold paper prepared by coating a substrate with a coating composition containing microcapsules of polyurethane resin or polyurea resin wall film and drying the resulting coating, characterized in that a latex of copolymer of comonomers comprising about 10 to about 50 percent by weight of styrene, about 15 to about 55 percent by weight of butadiene, about 10 to about 40 percent by weight of methyl methacrylate and up to about 15 percent by weight of acrylonitrile is incorporated into the coating composition. The stated advantage of this composition is that the pressure sensitive manifold paper has an adequate balance between the color forming ability and susceptibility to color smudges due to contact or friction.

U.S. Pat. No. 4,701,480 discloses a process for the preparation of aqueous polyurethane-urea dispersions having improved hydrolytic stability to enable the polyurethane-urea to be stably dispersed in an aqueous medium, in which anionic or potential anionic groups and, optionally, lateral or terminal, hydrophilic ethylene oxide units are chemically incorporated into the polyurethane-urea.

As described in the patent, the process may be carried out by adding alkali metal salts to polyurethane-urea dispersions containing anionic groups formed by neutralizing carboxylic acid groups with volatile organic bases. The alkali metal salts are added in an amount sufficient to displace at least a portion, preferably, substantially all of the volatile organic bases used to neutralize the potential anionic groups, preferably carboxylic acid groups. It is stated that films or coatings prepared from aqueous polyurethane-urea dispersions containing anionic groups neutralized with the alkali metal salts possess better hydrolytic stability than corresponding films or coatings prepared from aqueous polyurethane-urea dispersions containing anionic groups neutralized by volatile organic bases. The improvement in hydrolytic stability corresponds to the amount of volatile organic bases which are displaced by the alkali metal cations.

As disclosed in the patent, vinyl-modified polyethers are suggested for use in preparing the dispersions. In addition, the dispersions may be blended with other dispersions, for example, with polyvinyl acetate, epoxy resins, polyethylene, polystyrene, polybutadiene, polyvinyl chloride, polyacrylate and copolymer plastics dispersions.

U.S. Pat. No. 4,735,985 discloses a composition for coating a substrate with a chip and abrasion resistant polyurethane coating in which the coating composition comprises a fully reacted, solvent-soluble aliphatic polyurethane, an adhesion promoting amount of vinyl chloride-vinyl ester copolymer, and solvent for the polyurethane and copolymer to make the composition coatable. The preferred adhesion-promoting amount of a vinyl chloride-vinyl ester copolymer comprises from about 5 to about 60 parts by weight of the composition on a dry, solvent-free basis.

SUMMARY OF THE INVENTION

In one aspect, this invention is an aqueous polymer dispersion having a continuous aqueous phase in which are dispersed a plurality of polymer particles, wherein a first portion of said polymer particles are polyurethane-urea polymer particles and a second portion of the particles are particles of a hydrophobic polymer to which is grafted a polyurethane-urea polymer, which particles have an average particle size of about 1000 to about 10,000 Angstroms.

In another aspect, this invention is a process for preparing an aqueous dispersion, comprising:

(a) reacting a polyisocyanate with an organic polyol and an ionic group precursor material at relative proportions and under conditions such that an isocyanate-terminated prepolymer containing ionic or potentially ionic groups is formed, wherein said organic polyol comprises a dispersion in a continuous polyol phase of particles of a hydrophobic polymer having an average particle size of about 1000 to about 10,000 Angstroms, (b) dispersing said prepolymer in an aqueous phase and (c) chain-extending said prepolymer.

Surprisingly, it has been discovered that the hydrolytic stability, dimensional stability and modulus of films prepared from the dispersion are increased, relative to a similar dispersion containing only the polyurethane-urea particles. Additionally, and even more unexpected, is the discovery that permanent set properties of the films prepared from the dispersions remain relatively constant in spite of the films' increase in modulus properties.

It has also been discovered that the dispersions of this invention have surprisingly low viscosities.

The aqueous dispersions of this invention, by virtue of their good film-forming properties are useful in a wide variety of coating applications. The fact that the coatings have good tensile properties broadens the applications in which they can be employed. Typically they can be used as sizing in the manufacture of high grade paper, coatings and impregnants for textiles, leathers, fibers, and the like. However, the toughness of the films make them particularly useful as protective coatings for other plastic articles made from such materials as polycarbonates, acrylics, and the like.

DETAILED DESCRIPTION OF THE INVENTION

In one aspect, this invention an aqueous dispersion of a mixture of polyurethane-urea particles and particles of a hydrophobic polymer to which a polyurethane-urea polymer is grafted.

The polyurethane-urea particles comprises a polymer containing urethane and urea linkages. Optionally and preferably, the polymer also contains cationic or anionic groups, in an amount sufficient to render the particle stably dispersable in the aqueous phase. The molecular weight of said polymer is not particularly critical to this invention. The polymer may be cross-linked or linear. It is preferred that the polyurethane-urea polymers be phase-segregated, i.e., have discrete high $T_g$ and low $T_g$ phases. These phase-segregated polyurethanes exhibit an excellent combination of low temperature properties and physical strength. Such phase-segregated polyurethanes are generally characterized in that they are prepared from a relatively high equivalent weight rubbery component such as a polyether or polyester polyols and a low equivalent weight chain extender material which reacts with a polyisocyanate to form a high melting, hydrogen-bonded polymer segment. Suitable materials for forming the polyurethane-urea polymers are described more fully below.

The dispersion also contains particles of a hydrophobic polymer to which is grafted a polyurethane-urea polymer. For convenience, these particles are referred to herein as "hydrophobic particles". These hydrophobic particles comprise a polymer which is hydrophobic, i.e., not water-soluble or substantially water-swellable, which is grafted to a polyurethane-urea polymer. As discussed later, such hydrophobic particles are advantageously prepared by reacting particles of a vinyl monomer or mixture of vinyl monomers, which have isocyanate-reactive groups at least on the surface, with a polyisocyanate and chain extender to form the polyurethane-urea polymer grafted thereto.

Of the solids of the dispersion, about 0.1 to about 30. preferably about 0.5 to about 10, more preferably about 1 to about 5 weight percent is hydrophobic particles. The remainder of the solids is advantageously polyurethane-urea particles.

As discussed more fully later, the preferred process for making the dispersions of this invention involves the use of a "copolymer polyol", i.e., a dispersion of a vinyl polymer or copolymer in a continuous polyol phase. Because of the use of the copolymer polyol in the synthesis of this dispersion, the dispersion typically has a bimodal particle size distribution. The larger particles have particle sizes roughly corresponding to the particle size of the copolymer polyol, whereas the small particles, being polyurethane-urea particles, are substantially smaller. Generally, the larger particles have an average diameter from about 1000 to about 10,000, preferably about 2000 to about 8000, more preferably about 2000 to about 6000 Angstroms. The polyurethane-urea particles typically have an average diameter from about 100 to about 3000, preferably about 100 to about 800, more preferably about 200 to about 500 Angstroms.

Suitable methods of preparing aqueous dispersions of polyurethane-urea polymers are known and can be employed herein to prepare the dispersions of this invention, with the exception that the hydrophobic polymer particle is incorporated into the dispersed phase. This is advantageously done by substituting a copolymer polyol for all or a portion of the polyol component used in making the polyurethane-urea. Alternatively, a particulate hydrophobic polymer having isocyanate-reactive groups at least on the surface of the particles can be prepared in a separate step and combined with a polyol for reaction with a polyisocyanate. The particulate polymer can, for example, be made by emulsion polymerization in a continuous aqueous or polyol phase and recovered by separating the dispersed phase from the continuous phase. U.S. Pat. Nos. 3,870,684, 4,108,814, 4,203,883, 4,408,008 and 4,501,852 describe generally useful processes for making the aqueous dispersion. In the preferred process for preparing the dispersion of this invention, a prepolymer is prepared using a copolymer polyol. The prepolymer is dispersed in water and chain extended to form a dispersion.

The copolymer polyol is advantageously a dispersion having a continuous polyol phase in which are dispersed particles of a hydrophobic polymer. Such copolymer polyols are described, for example, in U.S. Pat. Nos. 4,394,491, 4,454,255 and 4,148,840, incorporated herein by reference. The continuous polyol phase preferably has an equivalent weight from about 250 to about 5000, more preferably about 500 to about 2500, most preferably about 800 to about 2000. The composition of the polyol phase is advantageously as is later described with respect to the polyol components, with polyether polyols being the preferred polyol component. The copolymer polyol also advantageously has a % solids of from about 1 to about 60, more preferably about 10 to about 45, most preferably about 25 to about 45 percent by weight.

The dispersed particles are advantageously polymers of one or more ethylenically unsaturated monomers. Suitable such monomers include vinyl and vinylidene halides, vinyl aromatic monomers such as styrene, vinyl naphthylene, vinyl toluene, α-methyl styrene and the like, unsaturated nitriles such as acrylonitrile and methacrylonitrile, acrylic esters such as methyl methacrylate, methyl acrylate, 2-hydroxyethylacrylate, 2-hydroxyethylmethacrylate, conjugated dienes such as butadiene, and the like, as well as other monomers as described by Hoffman et al in U.S. Pat. No. 4,394,491, incorporated by reference. Preferred among these are the vinyl aromatics, especially styrene, and the unsaturated nitriles such as acrylonitrile. The use of hydroxyl-containing monomers in small amounts (up to about 25 weight percent of monomers) is beneficial to incorporate isocyanate-reactive groups into the dispersed particles. Most preferred, however, are copolymers of styrene and acrylonitrile in a weight ration of about 10:90 to about 90:10, most preferably about 50:50 to about 80:20.

As stated before, in the preparation of the dispersion of this invention, the hydrophobic particle is grafted to a polyurethane-urea polymer. Thus, the hydrophobic particle advantageously contains reactive sites at which grafting can occur. These grafting sites are preferably isocyanate-reactive groups, and most preferably hydroxyl or primary and/or secondary amine groups. These can be introduced to the particle in a number of ways, such as by using a hydroxyl or amine-containing monomer in its preparation. However, if this method is used, care must be taken to avoid rendering the particle hydrophilic.

In a common method of manufacturing copolymer polyols, a stabilizer material comprising a polyol having induced unsaturation is used. This stabilizer is copolymerizable with the vinyl monomers, so that the resulting particle has on its surface a grafted hydroxy-functional component which is soluble in the continuous phase. Preferred stabilizers are polyether polyols which are partially capped with an unsaturated polyisocyanate such as isocyanatoethylmethacrylate and α,α-dimethyl metaisopropenyl benzylisocyanate (TMI). See, for example, U.S. Pat. Nos. 4,233,425 and 4,287,323. The copolymer polyol products made in this manner are most preferred herein, since the grafted hydroxy-functional component can react with a polyisocyanate to form a prepolymer. This prepolymer can then be chain extended as described hereinafter to form a hydrophobic particle grafted to a polyurethane-urea polymer.

The functionality of the continuous polyol phase is such that the average nominal functionality of the continuous polyol phase and any additional polyol which may be employed is in the range from about 1.8 to about 3.0, preferably about 2.0 to about 2.2. When the average functionality exceeds about 2.2, the prepolymer formed therefrom tends to be more viscous than desired. Thus, the functionality of the polyol phase of the copolymer polyol depends to some extent on whether an additional polyol is used. When the copolymer polyol is the sole polyol component, its continuous phase preferably has an average nominal functionality of about 2.0 to about 2.2. However, when the copolymer polyol is blended with an additional difunctional polyol, the nominal functionality of its continuous phase is preferably up to about 3.0. Most preferably, the copolymer polyol is blended with an additional substantially difunctional polyol at a weight ratio of about 1:99 to about 20:80, and the nominal functionality of the continuous polyol phase of the copolymer polyol is from about 2.2 to about 3.0.

As discussed above, it is preferred in most instances to blend the copolymer polyol with an additional, substantially difunctional polyol in making the prepolymer.

The organic polyols used as the continuous phase of the Copolymer polyol and as the additional polyol, if any, are preferably polyether polyols, polyester polyols, hydroxyl-terminated polycarbonates, hydroxyl-terminated polybutadienes, hydroxyl-terminated polybutadiene-acrylonitrile copolymers, hydroxyl-terminated copolymers of dialkyl siloxane and alkylene oxides such as ethylene oxide, propylene oxide and the like, and mixtures in which any of the above polyols are employed as major component (greater than 50% w/w) with amine-terminated polyethers and amino-terminated polybutadiene-acrylonitrile copolymers.

Illustrative of polyether polyols are polyoxy-ethylene polyols, polyoxypropylene polyols and polyoxy-butylene polyols which are optionally capped with ethylene oxide, random and block copolymers of ethylene oxide, propylene oxide, and butylene oxide, random and block copolymers of tetrahydrofuran and ethylene oxide and/or propylene oxide. Products derived from any of the above by reaction with difunctional carboxylic acids or esters derived from said acids are also useful, in which latter case ester interchange occurs and the esterifying radicals are replaced by polyether polyol radicals. The preferred polyether polyols are random and block copolymers of ethylene oxide and propylene oxide of functionality approximately 2.0 to about 3.0, more preferably about 2.0 to about 2.2, and polytetramethylene glycol polymers.

Illustrative of polyester polyols are those prepared by polymerizing ε-caprolactone using an initiator such as ethylene glycol, ethanolamine and the like, and those prepared by esterification of polycarboxylic acids such as phthalic, terephthalic, succinic, glutaric, adipic, azelaic and the like acids with polyhydric alcohols such as ethylene glycol, butanediol, cyclohexanedimethanol and the like.

Illustrative of the amine-terminated polyethers are the aliphatic primary and/or secondary amines structurally derived from polyoxypropylene glycols. Polyether amines of this type are available from Texaco under the trademark JEFFAMINE, including JEFFAMINE D-400, D-2000 and T-5000.

Illustrative of polycarbonates containing hydroxyl groups are those prepared by reaction of diols such as propane-1,3-diol, butane-1,4-diol, hexan-1,6-diol, 1,9-nonanediol, 2-methyloctane-1,8-diol, diethylene glycol, triethylene glycol, dipropylene glycol and the like with diarylcarbonates such as diphenylcarbonate or with phosgene.

Illustrative of the silicon-containing polyethers are the copolymers of alkylene oxides with dialkylsiloxanes such as dimethylsiloxane and the like; see, for example, U.S. Pat. No. 4,057,595.

Illustrative of the hydroxyl-terminated polybutadiene copolymers are the compounds available under the trade name Poly BD Liquid Resins from Arco Chemical Company. Illustrative of the dihydroxy- and diamine-terminated butadiene/acrylonitrile copolymers are the materials available under the trade name HYCAR hydroxyl-terminated (HT) Liquid Polymers and amine-terminated (AT) Liquid Polymers, respectively.

The prepolymer is advantageously prepared by reacting the copolymer polyol and additional polyol, if any, with a polyisocyanate in the presence of a ionic group precursor material, as described hereinafter. In preparing the prepolymer, an excess of isocyanate groups over isocyanate-reactive groups is used. Preferably the ratio of isocyanate groups to isocyanate-reactive groups present in the materials used to make the prepolymer is from about 1.2:1 to about 8:1, more preferably about 2:1 to about 5:1, most preferably about 2:1 to about 4:1. It is noted that this ratio depends somewhat on the desired properties of the product polyurethane-urea. As the excess of isocyanate groups increases, more chain extender is needed to react with the prepolymer. This leads to the formation of a polymer with a high hard segment content, which is therefore more rigid and higher melting the those polymers having low hard segment contents. Thus, the ratio of isocyanate:isocyanate reactive groups can substantially affect the ultimate properties of the product polyurethane-urea.

The polyisocyanate used to form the prepolymer is an organic compound having an average of about 2 to about 4, preferably about 2 to about 2.3, more preferably about 2 to about 2.1 isocyanate groups per molecule. Polyisocyanates having aromatically, aliphatically and cycloaliphatically bound isocyanate groups are useful herein, although those having aliphatically and cycloaliphatically bound isocyanate groups are preferred. Illustrative but non-limiting of the diisocyanates are 1,6-hexamethylene diisocyanate, 1,7-heptamethylene diisocyanate, 1,8-octamethylene diisocyanate, 1,9-nonamethylene diisocyanate, 1,10-decamethylene diisocyanate, 1,11-undecamethylene diisocyanate, 1,12-dodecamethylene diisocyanate, 2,2,4-trimethylhexamethylene diisocyanate, 2,4,4-trimethylhexamethylene diisocyanate, and the (3-isocyanatopropoxy)-(3-isocyanatopropyl)arylenes such as 1-(3-isocyanatopropoxy)-4-(3-isocyanatopropyl)benzene described in U.S. Pat. No. 4,051,166, 1,4-bis(2-isocyanatoethyl)cyclohexane, and the like; isophorone diisocyanate otherwise identified as 1-isocyanato-3-isocyanatomethyl-3,5,5-trimethylcyclohexane; and cycloaliphatic diisocyanates such as methylenebis(cyclohexyl isocyanate) including the 4,4'-isomer, the 2,4'-isomer, and mixtures thereof, and all the geometric isomers thereof including trans/trans, cis/trans, cis/cis and mixtures thereof, cyclohexylene diisocyanates (1,2-; 1,3-: or 1,4-), 1-methyl-2,5-cyclohexylene diisocyanate, 1-methyl-2,4-cyclohexylene diisocyanate, 1-methyl-2,6-cyclohexylene diisocyanate, 4,4'-isopropylidenebis(cyclohexyl isocyanate), 4,4'-diisocyanatodicyclohexyl, 1,4-diisocyanatocycloheptylene, 1,4-diisocyanatocyclooctylene; aromatic diisocyanates such as methylene diphenyl diisocyanate, ethylene diphenyl diisocyanate, toluene 2,4- and 2,6-diisocyanate, and their industrial isomer mixtures, naphthalene 1,5-diisocyanate, diphenyl diisocyanate, 3,3'-dimethyl-4,4'-diisocyanatodiphenyl, phenyl cyclohexylmethane diisocyanate, phenyl ethyl diisocyanate, and the like.

Preferred as a group are the cycloaliphatic diisocyanates and preferred within this group are the methylenebis(cyclohexyl isocyanates) with the 4,4'-isomer being particularly preferred.

Mixtures of the foregoing enumerated aliphatic, cycloaliphatic, and aromatic diisocyanates can also be used.

In the preferred process, an ionic group precursor material is also used in preparing the prepolymer. Such are known to improve the water dispersability of the prepolymer and the product polyurethane-urea. The "ionic group precursor material" is a compound or mixture of compounds having (1) an ionic group or potential ionic group, as that term is later defined, and (2) at least two isocyanate or isocyanate-reactive groups per molecule. Because of these latter groups, the ionic group precursor material reacts to form part of the prepolymer chain. It is preferred that the ionic group precursor material contains a plurality of isocyanate-reactive groups such as —OH, —NH$_2$, —SH, —COOH, and the like, and is more preferred that it contain an average of about 2.0 to about 2.2 hydroxyl groups per molecule.

The term "ionic group or potential ionic group" means (a) a anionic or cationic group or (b) a potential ionic group, i.e. one which is readily converted to an anionic or cationic group. Illustrative of such potential ionic groups are —COOH, —SO$_2$OH, and =POOH, tertiary amine, phosphine and sulfide groups, and =S. Such potential ionic groups are readily converted to ionic groups by techniques such as neutralization or quaternization. Exemplary such compounds are disclosed in U.S. Pat. No. 4,408,008, incorporated by reference, particularly column 6, line 63 through column 7, line 57. It is preferred to use materials containing a potential ionic group, which is converted to an ionic group after the formation of the prepolymer.

Neutralization of acid groups with bases such as alkali metal salts, tertiary amines and the like to convert the acid groups to the corresponding salt is well known and useful herein. It is preferred to use a tertiary amine to neutralize acid groups, especially a trialkyl amine such as triethylamine. Neutralization of tertiary amine groups with acids and quaternization thereof with materials such as alkyl halides, to form strong quaternary ammonium salts is also useful herein. Phosphines and sulfides can be converted to cationic groups by alkylating with an alkylating agent.

Illustrative but non-limiting of the compounds containing a potential anionic (ionic) group are tartaric acid (mono-, or di-sodium salt), 2,6-dihydroxy benzoic acid (sodium salt, potassium salt, triethylammonium salt), 2,8-dihydroxynaphthoic acid-3 (sodium salt, potassium salt, triethylammonium salt), 3,4-diaminobenzoic acid (sodium salt, potassium salt, triethylammonium salt), 1,7-dihydroxynaphthalenesulfonic acid-3 (sodium salt, potassium salt, triethylammonium salt), 1,8-dihydroxynaphthalenedisulfonic acid-2,4 (sodium salt, potassium salt, triethylammonium salt), 2,4-diaminotoluenesulfonic acid-5 (sodium salt, potassium salt, triethylammonium salt), the sulfonate diols described in U.S. Pat. No. 4,108,814 already incorporated herein, bis(β-hydroxyethyl)phosphinic acid (sodium salt, potassium salt, triethylammonium salt), and the like; illustrative of the compounds containing a potential cationic (ionic) group are methyldiethanolamine (hydrochloride salt, acetic acid salt), N,N-di(2-hydroxypropyl)aniline (hydrochloride salt, acetic acid salt), N-cyclohexyl-N-(3-aminopropyl)propanol-2-amine (hydrochloride salt, acetic acid salt), ethyldiethanolamine (hydrochloride salt, acetic acid salt), glycerol-α-bromohydrin quaternated with tributylamine (ammonium salt), or triethyl phosphine (phosphonium salt), glycerol-α-bromohydrin ternated with dimethyl sulfide (sulfonium salt), and the like.

Preferred ionic group precursor materials include dihydroxy alkanoic acids described in U.S. Pat. No. 3,412,054 incorporated herein by reference. The most preferred dihydroxy alkanoic acids are the α,α-dimethylol alkanoic acids having the formula $QC(CH_2OH)_2COOH$ wherein Q is hydrogen or $C_1$ to $C_8$ alkyl (preferred are those acids with $C_1$ to $C_4$). Preferred as the neutralizing agents are the aliphatic $C_2$ to $C_4$ tertiary amines including triethylamine, tripropylamine, tributylamine, triisopropylamine, and the like, and aqueous or anhydrous ammonia.

The amount of ionic group precursor material is not particularly critical except to the extent that it be sufficient to result in good dispersion of the prepolymer and final polyurethane-urea in water. Advantageously, the component is employed within a range of proportions such that the milliequivalents of ionic groups per 100 grams of prepolymer (A) falls within a range of from about 10 to about 150, preferably about 20 to 100, most preferably about 25 to 75.

It is also possible, but not generally preferred, to employ low equivalent weight chain extenders and cross-linkers in the preparation of the prepolymer. Known difunctional chain extenders such as the aliphatic $C_2$ to $C_{10}$ glycols as typically exemplified by ethylene glycol, 1,4-butanediol, 1,6-hexanediol, and the like are not specifically excluded from the present polymers.

In the preferred process the prepolymer is advantageously prepared by bringing together the copolymer polyol, ionic group precursor material, polyisocyanate and additional polyol, if any, under conditions such that they react to form a prepolymer having pendant ionic or potentially ionic groups. It is preferred to exclude moisture from the reactants during the formation of the prepolymer. It is also preferred to premix all isocyanate reactive components and all isocyanate-containing components, respectively. A reaction temperature of about 30° C. to about 150° C., preferably about 50° C. to about 125° C. is generally useful. A small quantity of a urethane catalysts such as an organotin compound or a tertiary amine compound may be used to speed the reaction. The reaction is advantageously continued until all isocyanate-reactive groups (other than acid groups which are intended to be converted to anionic group) have reacted.

In the preferred process, the potentially ionic groups are converted to ionic groups after the formation of the prepolymer. The conversion is preferably done so that at least about 75 percent, preferably at least about 90 percent of the potential ionic groups are converted to ionic groups.

In the preferred process, the prepolymer may be dispersed in the water either by adding water to the prepolymer, or by adding the prepolymer to water. The concentration of prepolymer in the aqueous dispersion is governed primarily by whatever is expedient in the handling of increased volumes. However, the prepolymer is advantageously present in a concentration of from about 10 percent to about 50 percent by weight based on prepolymer and water. Preferably, its concentration is from about 25 to about 40 percent.

The prepolymer is often not stably dispersable in water, so it is often desired to conduct the chain extension reaction within a relatively short period, such as within about two hours, preferably within about one hour, more preferably within about 30 minutes of the formation of the prepolymer dispersion.

In the preferred process, the chain extension reaction is advantageously conducted by reacting the prepolymer with water or an amine chain extender. When water is the chain extender, the reaction is conveniently conducted by agitating the prepolymer dispersion and adding an effective amount of a urethane catalyst. Completion of the chain extension reaction with water is indicated when the evolution of carbon dioxide is completed. When an amine chain extender is used, a suitable process is that described in U.S. Pat. No. 4,895,894 incorporated herein by reference. In such process, the amine is added to the aqueous prepolymer dispersion either neat, when it is water soluble or dispersible, or as a solution, under conditions of agitation. Because of the reactivity of amine groups with isocyanates, it is usually not necessary to heat the reacts about ambient room temperatures, i.e., 20° C. to about 30° C. to conduct the reaction. Mixing is continued until the reaction is complete, which typically occurs within about one hour.

The preferred chain extenders include water and polyamine compounds. The amine groups on the polyamine can be primary or secondary or a mixture of both, and aliphatic or aromatic. Preferred chain extenders are water and the aliphatic polyamines having about 2 to about 4, preferably about 2 primary and/or secondary amine groups per molecule. Preferred as a class are the primary alkylene diamines.

Illustrative but non-limiting of the polyamines are ethylenediamine, 1,3-propylenediamine, 1,4-butylenediamine, 1,5-pentylenediamine, 1,6-hexylenediamine, 1,7-heptylenediamine, 1,8-octylenediamine, 1,9-nonylenediamine, 1,10-deoylenediamine, 2,2,4-trimethylhexamethylenediamine-1,6, 2,4,4-trimethylhexamethylenediamine-1,6, diethylene triamine, triethylene tetramine, iminobispropylamine, and the like: 1,2-cyclohexylenediamine, 1,3-cyclohexylenediamine, 1,4-cyclohexylenediamine, 4,4'-isopropylidenebis(cyclohexyl amine), 4,4'-diaminodicyclohexyl, methylenebis(cyclohexylamine) including the 4,4'-isomer, the 2,4'-isomer and mixtures thereof including all their geometric isomers, 1-amino-3-aminomethyl-3,5,5-trimethylcyclohexane, and the like; 1,3-phenylenediamine, 1,4-phenylenediamine, 2,4-toluenediamine, 2,6-toluenediamine, 4,4'-methylenebis(phenyl amine), 2,4'-methylenebis(phenyl amine), 4,4'-diaminobenzidine, 3,3'-diaminobenzidine, polymethylene polyphenylene amines, and the like.

More preferred as a class of extenders are the $C_2$ to $C_8$ alkylene diamines.

The proportions of chain extender to prepolymer are such that the ratio of isocyanate equivalents to amine hydrogen equivalents falls in a range of from about 1.5 to about 0.90, and, preferably from about 1.20 to 0.95, more preferably about 0.95 to about 1.1.

The resulting aqueous dispersions of ionic polyurethane-urea in accordance with the present invention are milky in their visual appearance. They are characterized by excellent stabilities. Generally speaking, the dispersions can be stored for a long period of time, i.e., days to months, and transported within this period without significant evidence of separation or gellation.

As mentioned before, the dispersion of this invention is often characterized by having a bimodal particle size distribution, with larger particles being primarily those of the hydrophobic polymer and the larger particle being primarily of the polyurethane-urea polymer.

The polymer dispersions can be modified further by the addition of colorants, antioxidants, UV stabilizers, fillers, fire-retardants and the like.

Various kinds of substrates can be coated with films from these aqueous dispersions. After the aqueous dispersions are brushed, sprayed, poured, applied by dip-coating, doctor-knife, or otherwise applied to a substrate such as woven and non-woven textiles, leather, paper, wood, metals, ceramics, fibers, plastics such as polycarbonates, acrylics, polyamides, polyurethanes, polyesters, polystyrenes, acrylonitrile/butadiene/styrene copolymers, polyethylenes, (high, low and ultra-low densities), rubbers including natural and synthetic, and the like, the water is removed by conventional drying methods.

After applying this dispersion to a substrate, the coated substrate is advantageously dried to coalesce the dispersed particles. Drying can be carried out either at ambient room temperatures (e.g., 20° C.) or at elevated temperatures, for example, from about 25° C. to about 150° C., preferably from about 25° C. to about 80° C., optionally under forced-draft or vacuum. If desired, a coagulating agent such as a salt of a polyvalent metal or an organic acid may be used in forming films or coatings from this dispersion.

Free-standing films can also be formed from this dispersion in any convenient manner. For example, the aqueous dispersion can be poured into the appropriate mold, or applied by doctor-knife to a metal glass plate. Thereafter, the water can be removed in stages using a series of different temperatures with optional use of vacuum. Generally speaking, it is preferred to initially remove the major amount (up to 25 percent) of the water under forced air conditions and at low temperatures (e.g., 20° C. to 30° C.). If the film has enough structural integrity at this stage, it can be hung or optionally oriented by placing under tension in an appropriate device while the remaining water is removed, preferably at an elevated temperature, for example, from about 50° C. to about 150° C. Final conditioning of the film can be completed under controlled conditions of heat and humidity.

The films in accordance with the present invention, whether deposited on a substrate or made as free standing films, can be prepared in any desired thickness. Typically, the films can have a thickness of from about one mil to about 50 mils.

The polymers made from this dispersion are characterized by having excellent toughness, high gloss and good tensile properties. These polymers also exhibit improved water resistance, as determined by water adsorption measurements. This makes them particularly useful in the manufacture of waterproof clothing, tarpaulins, chip-resistant coatings in automotive applications, as coatings for high grade paper, as well as other application which involve exposure to water or atmospheric moisture.

The following examples are provided to illustrate the invention but are not intended to limit the scope thereof. All parts and percentages are by weight unless otherwise indicated.

EXAMPLE 1

Into a stirred reaction vessel, are added 90 parts Polyol A, 19.8 parts Copolymer Polyol A, 6.7 parts of 2,2-bis(hydroxymethyl)propionic acid (DMPA), and 40 parts of methylenebis (4-isocyanatocyclohexane) ($H_{12}MDI$). Polyol A is a 1000 equivalent weight, nominally difunctional poly(propylene oxide) having 13% by weight ethylene oxide end-capping. Copolymer Polyol A is a 43% solids dispersion of 70%styrene/30%acrylonitrile particles in a nominally trifunctional polymer poly(propylene oxide) having about 14% by weight ethylene oxide end-capping. The equivalent weight of Copolymer Polyol A is about 1980. Copolymer Polyol A is made using an stabilizer which is prepared from a polyol and an unsaturated isocyanate, so that hydroxyl-terminated polyether chains are on the surface of the dispersed styrene/acrylonitrile particles. The mixture is stirred under nitrogen at 100° C. for 2 hours. The resulting mixture is then cooled to 70° C. and 5.1 parts of triethylamine (TEA) are added. Stirring is continued for 10 minutes at 70° C., and then 0.8 parts of octadecyl-3,5-di-t-butyl-4-hydroxy-hydrocinnamate (Irganox 1076 stabilizer) are added. Stirring is then continued for 5 additional minutes at 70° C. With rapid agitation, 340 parts of water are added to the mixture, and an aqueous emulsion of the prepolymer is formed having a temperature of about 45° C. While continuing to stir rapidly, 3.0 parts of ethylenediamine (EDA) in 50 parts of water are added to the emulsion. The resulting mixture is stirred for 10 minutes, without further heating. The resulting dispersion has a pH of 9.0 and contains 30% solids by weight. Of the solids content, about 95% is polyurethane-urea polymer and about 5% is SAN copolymer.

The foregoing process is repeated, except that the amount of Polyol A is decreased to 70 parts and the amount of Copolymer Polyol A is increased to 59.4 parts. The product dispersion has a pH of 9.0 and contains 30% solids by weight. About 14% of the solids is styrene/acrylonitrile copolymer and about 86% is polyurethane-urea polymer.

A third dispersion is prepared using the following amounts of ingredients:

TABLE 1

| Component | Parts by Weight |
| --- | --- |
| Polyol A | 225 |
| Copolymer Polyol A | 49.5 |
| DMPA | 25.1 |
| $H_{12}MDI$ | 133.8 |
| TEA | 19.1 |
| Irganox 1076 | 2.3 |
| EDA | 11.3 |
| Water | 090 |

The same procedure is used as for the first two samples, except that the water temperature is 74° C. at the time it is added to the prepolymer. The resulting dispersion is viscous and foamy, and has a pH of 9.5. The dispersion contains 30% solids. Of the solids, about 4.3% is styrene/acrylonitrile copolymer and about 95.7% is polyurethane-urea polymer.

EXAMPLE 2

A portion of Copolymer Polyol A is filtered to remove the styrene-acrylonitrile copolymer from the dispersion. The copolymer is then rinsed with alcohol to remove residual triol. The separated SAN copolymer is redispersed in Polyol A to provide a new dispersion containing ·36.2% solids. The SAN particles have a mean particle size of about 4,440 Å (Hydrodynamic Chromatography) and the new dispersion has an OH number of 36.9. This new dispersion is referred to herein as SAN Dispersion A.

A dispersion is made from the following components:

TABLE 2

| Component | Parts by Weight |
| --- | --- |
| Polyol A | 49.9 |
| SAN Dispersion A | 76.0 |
| DMPA | 6.7 |
| $H_{12}MDI$ | 40 |
| DBTDL | 0.1% based on solids |
| TEA | 5.1 |
| Irganox 1076 | 0.8 |
| EDA | 3.0 |
| Water | 425.0 |

The same procedure as in Example 1 is followed, except that dibutyltin dilaurate (DBTDL) is added in the preparation of the prepolymer and the water temperature is 60° C. at the time it is added to the prepolymer.

A viscous dispersion with pH 9 and 30% is obtained. In order to make the material less viscous, the solid content is reduced to 25% by adding 125 parts of water. Of the solids content of this dispersion, about 15% is styrene/acrylonitrile copolymer and about 85% is polyurethane-urea polymer.

A second dispersion is made in like manner except the amount of Polyol A is decreased to 24.9 parts, the amount of SAN Dispersion A is increased to 114 parts, and the water is increased to 585 parts so that a 25% solids dispersion is obtained. Its pH is about 8.5. Of the solids content of this dispersion, about 21% is styrene/acrylonitrile copolymer and about 79% is polyurethane-urea polymer.

A third dispersion is made in like manner, except that 152 parts of SAN Dispersion A replaces the Polyol A and SAN Dispersion A of the first two dispersions and 625 parts water are used. The resulting product has 25% solids and a pH of about 8.5. Of the solids content of this dispersion, about 27% is styrene/acrylonitrile copolymer and about 73% is polyurethane-urea polymer.

EXAMPLE 3

A test is conducted to compare the water absorption of films made from the aqueous dispersions of this invention containing the styrene-acrylonitrile hydrophobic copolymers [SAN] as compared to the same film made from aqueous dispersions not containing the styrene-acrylonitrile copolymer. The results of these tests are set forth in Table I below.

TABLE I

| Compositions | Formulation | | | Hydrolytic Stability Data | | | | |
| --- | --- | --- | --- | --- | --- | --- | --- | --- |
| | Equiv. Wt Ratios # | % Triol | % SAN | Modulus @ 300% Elongation | Tensile Strength | | | |
| | | | | | Before** | After** | % Change in Tensile Str. | % Water Absorp |
| 1 | 1/3/1/1 control | 10*** | 0 | 250 | 2640 | 2200 | −17 | 8.6 |
| 2 | 1/3/1/1 | 10*** | 5 | 320 | 3500 | 3900 | +11 | 6.0 |

1/X/Y/Z - Polyol/Diisocyanate/Carboxylic acid diol/diamine.
**Before or after hydrolytic stability test; 1 week in 70° C. water.
***Triol composition is about 60% Polyol A + 40% Copolymer Polyol A.

The modulus and tensile strength of the two compositions are measured by standard techniques. The water absorption is measured by immersing a film approximately 35 mils thick prepared from aqueous dispersions having the formulations set forth in compositions 1 and 2 into water at 50° C., and periodically removing the films and measuring the weight gain observed over a period of time until such time as the weight gain stabilized. This period could run anywhere from 1 to 4 days.

As can be observed from the data set forth in Table I, films prepared from compositions in accordance with the invention containing 5% styrene-acrylonitrile copolymer polyol have an increase in tensile strength of approximately 11%, and a water absorption of 6%. In contrast, the same film prepared from a composition not containing the styrene-acrylonitrile copolymer has a change in tensile strength of −17%, and a water absorption of 8.6% by weight.

We claim:

1. An aqueous polymer dispersion having a continuous aqueous phase in which are dispersed a plurality of polymer particles, wherein a first portion of said polymer particles are polyurethane-urea polymer particles and a second portion of the particles are particles of a hydrophobic polymer to which is grafted a polyurethane-urea polymer, said second portion of particles having an average particle size of about 1000 to about 10,000 Angstroms, wherein said hydrophobic particles constitute about 0.5 to about 10 percent of the total weight of the particles.

2. The dispersion of claim 1 wherein said hydrophobic polymer is a polymer of a vinyl aromatic monomer, an ethylenically unsaturated nitrile or a mixture thereof.

3. The dispersion of claim 2 wherein said second portion of particles constitutes from about 0.5 to about 10 weight percent of the combined weight of said first and second portions of particles.

4. The dispersion of claim 3 wherein said polyurethane-urea polymer contains ionic groups in an amount sufficient to measurably improve the water dispersability of the particles.

5. The dispersion of claim 4 wherein said polyurethane-urea particle is phase-segregated.

6. The dispersion of claim 5 wherein said hydrophobic polymer is a polymer of styrene, acrylonitrile or mixtures thereof.

7. The dispersion of claim 7 wherein said ionic groups are carboxylic acid salt groups.

* * * * *